Feb. 26, 1924.　　　　　　　　　　　　　　1,484,780
G. W. HEISE ET AL
PERMEABLE DEPOLARIZING MASS AND PROCESS OF MAKING THE SAME
Filed Nov. 15, 1921
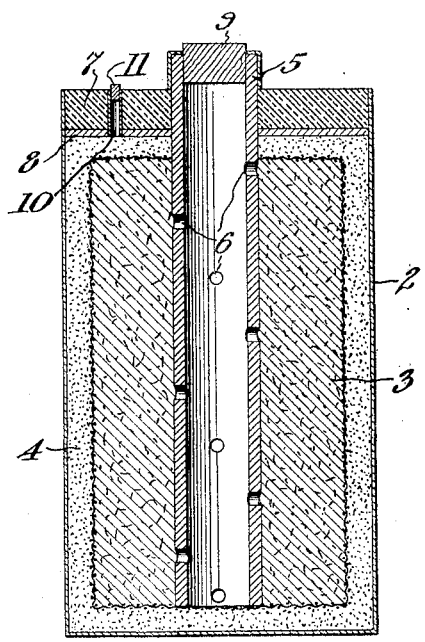
Inventors:
George W. Heise,
Clarence W. Brokate,
by Byrnes, Townsend & Bickenstein,
Attorneys.

Patented Feb. 26, 1924.

1,484,780

UNITED STATES PATENT OFFICE.

GEORGE W. HEISE, OF ELMHURST, NEW YORK, AND CLARENCE W. BROKATE, OF DANBURY, OHIO, ASSIGNORS TO UNION CARBIDE & CARBON RESEARCH LABORATORIES, INC., A CORPORATION OF NEW YORK.

PERMEABLE DEPOLARIZING MASS AND PROCESS OF MAKING THE SAME.

Application filed November 15, 1921. Serial No. 515,366.

*To all whom it may concern:*

Be it known that we, GEORGE W. HEISE and CLARENCE W. BROKATE, citizens of the United States, residing at Elmhurst and Danbury, respectively, in the counties of Queens and Ottawa and States of New York and Ohio, have invented certain new and useful Improvements in Permeable Depolarizing Masses and Processes of Making the Same, of which the following is a specification.

This invention relates to dry cells and has particular reference to improvements in depolarizers for such cells. A principal object of the invention is to provide depolarizing bodies capable of rapidly absorbing water.

In making up depolarizing mix for dry cells, according to prior practice, water or electrolyte solution has been used to bring the comminuted and intermingled manganese dioxide, carbon and electrolyte salts into plastic condition for tamping or molding. If the shaped masses of depolarizer so made are allowed to dry out, the salts crystallize from the gradually concentrating solution diffused throughout the depolarizer and cement the mix particles together to form a hard mass very slowly permeable by water. I have discovered that by using a non-aqueous liquid, or a liquid containing a relatively small amount of water, as the plasticizing agent, it is possible to make a readily permeable depolarizing body having adequate coherence and hardness.

Our invention will be described in connection with the tubular masses of depolarizer carrying a central carbon rod and referred to in the trade as "mix bobbins." It is to be understood, however, that the invention is applicable to the preparation of any type of depolarizing mass in which a high rate of water absorption is desirable.

In the manufacture of mix bobbins it is the practice to tamp the depolarizing mix, moistened with water, about a carbon rod, or to mold a tubular body of moist mix and then force a carbon rod into the central perforation. Bobbins so formed may be allowed to dry, after which they may be wrapped in fabric, such as cheese cloth, and immersed in water for a considerable time so that they may take up an adequate amount of moisture before assembly with the other cell elements. According to our invention the manufacture of cells of this kind is considerably expedited, as the improved bobbins acquire in a few minutes a water content at least equal to that of bobbins of the old type after long immersion.

Furthermore, the difficulty with which water penetrates bobbins made according to prior practice is a marked disadvantage when they are to be used in dry cells of the water activated type. Deferred action cells containing moisture and adapted to be actived by insertion of one of the electrodes are subject to deterioration through drying out on standing. Water activated cells, on the other hand, are free from this defect and from the corrosion which is frequently caused by the presence of liquid. The chief objection to their use has heretofore been the slowness with which water is taken up. A period of several hours is usually required and it is in general necessary to add the water in small quantities at intervals. By the preparation of the depolarizer as described herein, the time required for activation may be reduced to a few minutes.

As noted above, a non-aqueous liquid or one containing a relatively small proportion of water, is used in rendering the mix plastic. A number of liquids may be used, for example, ethyl alcohol, methyl alcohol, and benzene. The basic idea of our invention is the use of a plasticising liquid in which the electrolyte salts are insoluble, or of a liquid capable of dissolving the salts in whole or in part but yielding on evaporation a deposit which does not bind the mix particles together into a difficultly permeable mass. In general, any liquid, or mixture of liquids, having these characteristics and capable of giving temporary or permanent coherence to the mix is suitable for use in preparing a readily permeable depolarizer.

Any suitable depolarizing composition may be adopted and may be worked up into bobbins or other shapes in the usual manner, a liquid of the type above defined being used instead of water. The electrolyte salts will in general be zinc chlorid and ammonium chlorid. Ethyl alcohol of about 95% is preferred for agglomerating the mix. Both of the salts referred to are dissolved by alcohol, but they are generally present in amount substantially exceeding the solvent capacity of the quantity of alcohol used. I have found, moreover, that even though these salts be dissolved in part by the alcohol, the evaporation of the solvent does not result in the formation of a difficultly permeable mass. The solvent may be diluted with water to some extent without material loss of permeability in the molded mix. The alcohol may be denatured, provided the added substance would not exert a detrimental influence on the cell. Bobbins prepared as described will usually be dried before use and substantially all of the alcohol will evaporate before the cell is assembled. However, if a portion of the alcohol remains it will do no harm. The removal of the liquid may be expedited by moderate heat, suction, or the like, if desired, and means may be provided for the recovery of vapors. The bobbins may be wrapped in fabric or be provided with other forms of surface protection, according to well known methods.

One embodiment of our invention will be described in connection with the accompanying drawing, in which the figure is a vertical longitudinal section through a dry cell of the water activated type.

Reference numeral 2 denotes a zinc container electrode having a dry molded mix bobbin 3 therein, comprising carbon and manganese dioxid. The bobbin is spaced from the sides and bottom of the container, and the space between these two parts is filled by a dry paste-forming material 4, of any suitable kind.

A longitudinally perforated carbon electrode 5, open at both ends, passes centrally through the mix. A plurality of transverse perforations 6 afford communication between the mix and the interior of the carbon electrode. A seal 7 and a non-conducting disc 8 are fitted in the upper end of the zinc container 2, above the mix, and the carbon electrode 5 passes through a central perforation in the seal, and disc. A cork 9 or other closing means is provided for the opening in the upper end of the carbon electrode. In some instances a vent 10 having a stopper 11 is arranged in the seal to facilitate the escape of air.

To put the cell in action, water is added through the opening in the projecting end of the carbon electrode. The stopper 11 will be temporarily removed to facilitate the escape of air which is displaced by the liquid. The mix is rapidly penetrated by the water emerging from the hollow carbon through perforations 6, and the dry paste-forming material is moistened by contact with the saturated mix, as well as by the escape of water from the bottom of the carbon electrode. The salts are dissolved as the water traverses the mix and the resulting electrolyte solution is uniformly distributed through the cell.

The paste may be of any suitable kind, but an exceedingly rapid activation may be obtained by the use of a dry granular paste-forming material of the type described in the application of R. C. Benner and H. F. French Serial No. 356,496, filed February 5, 1920. Such a material may be, for example, coarse ground cereals, granulated uncooked flour paste, agar-agar, etc. It is characteristic of such substances to be readily permeable to liquids such as water or water containing electrolyte. A dry cell embodying the combination of a readily permeable mix bobbin prepared according to this invention, and a dry granular paste-forming material offers very slight opposition to the diffusion of activating liquid. The absorptive capacity of the permeable mix is high, so that a relatively large amount of liquid may be stored in the cell. The increased permeability is not accompanied by any segregation of mix particles increasing the internal resistance of the cell.

Water may obviously be added in other ways than through a hollow carbon electrode, and the permeable mix may be tamped into the cell, instead of being molded. It is possible in some cases, also, to omit a part or all of the electrolyte salts from the mix and to use an electrolyte solution for impregnating or activating. Various other departures from the particular embodiment described herein may be made within the scope of the appended claims.

We claim:

1. A process of preparing a depolarizer containing electrolyte salts which operate, upon separation from water solution, to render the depolarizer difficultly permeable, comprising associating with the ingredients of the depolarizer a liquid which does not contain water in amount sufficient to dissolve said salts, shaping said depolarizer, and removing said liquid therefrom.

2. A process of preparing a depolarizer comprising forming a mixture of a finely divided reducible compound, a conductive material, and an electrolyte salt and making said mixture plastic by incorporating therewith a liquid adapted to be removed without rendering said mixture difficultly permeable, and removing said liquid therefrom.

3. The invention according to claim 2, in which the liquid is an organic compound.

4. The invention according to claim 3, in which the liquid is an alcohol.

5. The invention according to claim 4, in which the alcoholic liquid contains ethyl alcohol.

6. The invention according to claim 5, in which the alcoholic liquid is ethyl alcohol of approximately 95%.

7. A coherent, substantially dry depolarizing composition comprising conductive and depolarizing materials bonded with electrolyte salt in a condition permitting rapid liquid absorption by the composition.

8. A coherent depolarizing composition such as may be prepared by bonding conductive and depolarizing materials with electrolyte salt deposited in situ from an organic liquid.

9. A substantially dry formed body comprising manganese depolarizer, a conductive material, and electrolyte salts, said salts being present in a form devoid of the permeation-inhibiting properties of electrolyte salts deposited in situ from aqueous solution.

10. A coherent depolarizer comprising a finely divided reducible compound, a conductive material, and an electrolyte salt, a relatively small portion only of said salt being encrusted upon the said compound and material.

11. A coherent depolarizer readily permeable by water, comprising a finely divided reducible compound, a conductive material, and an electrolyte salt, the major portion of said salt being without bonding action upon said depolarizer.

12. The invention according to claim 11, in which the depolarizer is in the form of a mix bobbin.

13. A mix bobbin for dry cells comprising comminuted manganese dioxid and conductive carbon, together with zinc chlorid and ammonium chlorid, no substantial part of said salts having a crystalline form produced by deposition from solution whereby ready permeability of the bobbin by water is obtained.

14. A dry cell adapted to be activated by the addition of water, and comprising a coherent depolarizer readily permeable by water.

15. A dry cell comprising a zinc container electrode, a longitudinally perforated carbon electrode having transverse passages, a paste-forming material adjacent said container electrode, and a readily permeable coherent depolarizing mix surrounding said carbon electrode and adjacent the paste-forming material.

16. The invention according to claim 15, in which a dry granular paste forming material is used.

In testimony whereof, we affix our signatures.

GEORGE W. HEISE.
CLARENCE W. BROKATE.